Sept. 26, 1950            E. H. ZIPF            2,523,640
MOWING MACHINE GUARD
Filed Oct. 9, 1946
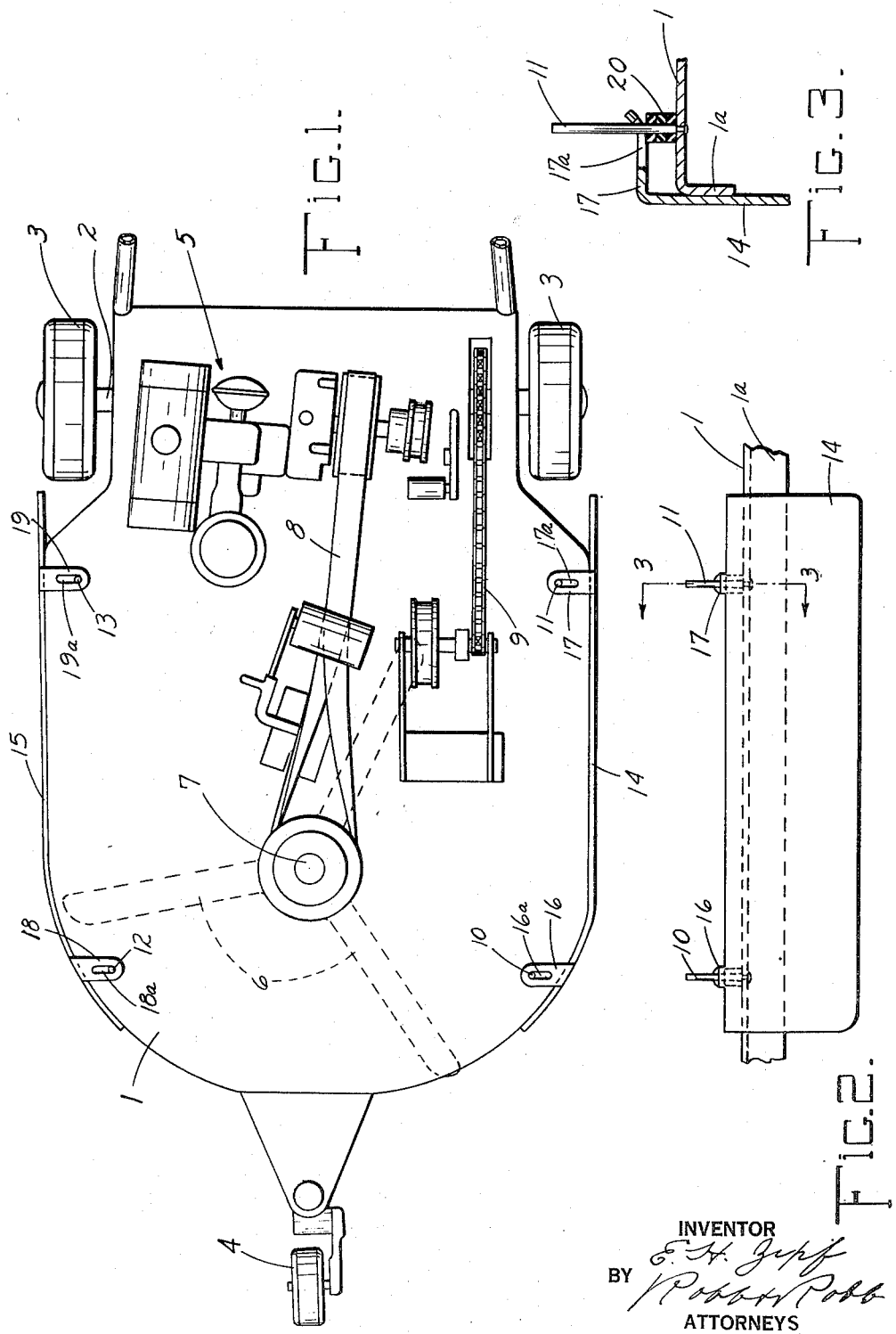
INVENTOR
E. H. Zipf
BY Robert Robb
ATTORNEYS Patented Sept. 26, 1950

2,523,640

UNITED STATES PATENT OFFICE 2,523,640

MOWING MACHINE GUARD

Edward H. Zipf, Cleveland, Ohio, assignor to The Power Development Company, Inc., Cleveland, Ohio, a corporation Application October 9, 1946, Serial No. 702,321

7 Claims. (Cl. 294—62)

My present invention comprises novel guard means particularly adapted for use with lawnmowers, or grass cutting machines or the like devices.

One object of my invention is to provide guard means of the type referred to in association with a grass cutting or like machine in such a manner to prevent persons from becoming injured by the cutting blades of the machine while not interfering with the cutting operations of such cutting blades of the machine.

Another object of my invention is to provide guard attachment means of the type referred to in a novel association with a grass cutting or like machine such that the said guard means has a floating relation to said machine.

Another object of the invention is to provide guard means of the type referred to having a novel association with a grass cutting or like machine such as to provide a hinging relation of said guard means with respect to said machine.

Still a further object of the invention is to provide guard means of the type referred to in novel association with a grass cutting or like machine such as to provide both a floating relationship and a hinging relationship of the guard means with respect to said machine.

A further object of the invention is to provide guard means of the type referred which is readily attachable to conventional types of grass cutting or the like machines, which is readily adjustable with respect to such machine, and which is readily detachable from such machine.

In general my invention contemplates the provision vertically disposed guide members associated with the frame or body of the grass cutting or like machine, and guard members of apron-like form adapted to extend substantially vertically in a normal condition and having attaching members for association with the guide members, the attaching members having longitudinal slots for loosely receiving respective guide members. Preferably each guard member has a plurality of attaching members, usually two, extending from the guard member in spaced relation to one another and each attaching member having a longitudinal slot for loosely receiving a respective guide member, the axes of the slots of the attaching members of a respective guard member extending in parallel relation.

Preferably also the free ends of the lugs or attaching members are upwardly curved and spacer members may be provided on the guide members for preliminary vertical adjustment of the guard members with respect to the machine.

Other objects, advantages and features of the invention will appear from the following detailed description taken in conjunction with the accompanying drawings in which:

Figure 1 is a somewhat diagrammatic illustration, plan view, of a mowing machine illustrating the guard means of my invention associated therewith.

Figure 2 is a side elevation, partially broken away, of the apparatus illustrated in Figure 1, and omitting certain parts mounted upon the frame of the mowing machine and seen in Figure 1.

Figure 3 is a sectional view taken on the line 3—3 of Figure 2.

Now referring to the drawing for a detailed description of the invention, the mowing machine generally comprises a frame plate designated by the numeral 1 carrying an axle 2 upon which are mounted rear wheels 3, the frame 1 carrying at the front end a castor wheel 4. Upon the frame 1 are mounted a suitable engine generally designated by the numeral 5 and the cutting blades 6 carried by shaft 7 rotatably mounted relative to frame 1, which blades 6 rotate in a horizontal cutting plane. Shaft 7 and blade 6 are rotatably driven from the engine 5 by means of an endless belt 8 trained over suitable pulleys respectively mounted on the shaft 7 and the drive shaft of the engine 5. The engine 5 serves to drive the wheels 3 through suitable means including the sprocket chain 9.

The details of construction of the mowing machine itself are not here described in any detail because they form no part of the present invention.

Now passing to the guard means of the present invention, the same comprises the vertical guide members 10, 11, 12 and 13 suitably secured to the base member 1 and extending upwardly from the upper surface thereof, these guide members serving to support the novel guard members 14 and 15 as hereinafter described. These guard members 14 and 15 comprise metal plates as seen in side elevation in Figure 2 and curved at their forward ends as seen best in Figure 1 to conform with the curvature of the frame plate 1. The guard member 14 is formed with off-standing lugs 16 and 17 comprising attaching members formed respectively with longitudinal slots 16a and 17a through which the guide members 10 and 11 extend respectively when the guard member is in association with the machine. Lugs 16 and 17 are secured to the apron-like guard member 14 adjacent the upper edge thereof, lug 17 extending from the straight portion of the guard member.

Lug 16 extends from the curved portion of the guard member 14 and preferably the lugs 16 and 17 extend from the guard member 14 in a parallel direction. More important however is the fact that the slots 16a and 17a are disposed with their longitudinal axes parallel to one another, the longitudinal axis of the slot 17a being normal to the edge of the straight portion of the guard member 14 while the longitudinal axis of the slot 16a extends in a direction at an angle to the edge of the curved portion of the guard member 14, the attaching members having their longitudinal axes disposed normal to the plane of the adjacent portion of the guard member.

Similarly the guard member 15 has the offstanding lugs or attaching members 18 and 19 respectively corresponding to the lugs 16 and 17 of the guard member 14. Similarly also the lugs 18 and 19 are provided with longitudinal slots 18a and 19a through which the guide members 12 and 13 extend when the guard member 15 is associated with the machine. The slots 18a and 19a have their longitudinal axes disposed in a manner corresponding to that described in reference to the longitudinal axes of the slots 16a and 17a respectively.

As best shown in Figure 3, the lugs 16, 17, 18 and 19 are each curved slightly upwardly at the free ends thereof, the curvature beginning at a point intermediate the ends of the respective longitudinal slot so that a portion of the longitudinal slot extends in the direction of its axis into the curved portion of the respective lugs. Apertured spacer members or washers formed of rubber or other suitably resilient material may be placed on the guide members 10, 11, 12 and 13 intermediate the frame plate 1 and the respective lugs 16, 17, 18 and 19, as for example shown in Figure 3, for adjustably positioning the guard members 14 and 15 to the desired height with respect to the surface upon which the mowing machine is to be operated. Sufficient numbers of these spacer members 20 will be provided on each of the guide members 10, 11, 12 and 13 to position the guard members 14 and 15 so the lower edges will just clear the ground surface upon which the mowing machine is to be operated, in the usual case, although the adjustment may be different dependent upon particular conditions.

The frame plate 1 has a downwardly flanged portion 1a extending downwardly in a direction at substantially right angles in the main portion of the frame plate 1 for a distance of some 2 or 3 inches all around the machine, said flange portion 1a providing a substantial bearing surface against which the guard members 14 and 15 engage in a normal condition thereof when associated with the mowing machine as shown in the drawing. In this normal condition of the association of the guard members 14 and 15 with the mowing machine, the guide members 10, 11, 12 and 13 engage the ends of the respective slots which are toward the free ends of the respective lugs so that the guard members 14 and 15 are flatly and positively engaged with the downwardly extending flanged portion 1a of the frame.

Thus when the machine is in use for grass cutting operations, the guard members 14 and 15 will prevent injury to the cutting blades 6 by objects in the path of movement of the machine such as curbs, trees, rock borders, etc. In event of engagement of such obstacles with the guard members from the outside of the latter, the guard members 14 and 15 will be rigidly held in position by reason of their association with the guide members 10, 11, 12 and 13 and the engagement of the guard members with the flange portion 1a of the frame. However, in the event that objects are engaged with the guard members from the inside thereof by reason of lateral movements of the machine, the effect will be to cause hinging action of the guard members outwardly to allow the guard members to pass over such objects. Also of course stones or other objects with which the under edges of the guard members 14 and 15 may engage in course of movement of the machine will cause lifting up of the guard members by reason of their floating attachment to permit the guard members to pass over such objects.

Thus the novel guard attachment means of my invention provides a floating relation of the guard members with respect to the machine permitting the guard members to move vertically and also said attachment means provides rocking or hinge movement of the guard members prmitting such rocking or hinge movement of the guard members outwardly away from the machine.

Having thus described my invention what I claim as new and desire to secure by Letters Patent of the United States, is:

1. In combination, a mowing machine comprising a frame, guide members secured to said frame and extending upwardly therefrom, a guard member, and attaching members secured to said guard member and off-standing therefrom, said attaching members each being provided with a longitudinal slot loosely receiving a respective guide member, and said guard member extending downwardly from the periphery frame member.

2. A guard member for frames of mowing machines or the like comprising a plate, and attaching members secured to said plate and laterally off-standing therefrom adjacent the upper edge thereof, each of said attaching members having a respective longitudinal slot for receiving loosely a respective guide member, and each of said attaching members being curved upwardly at its free edge, the curvature of each attaching member extending from a point intermediate the ends of the slot to the free edge of the respective attaching member.

3. A guard member of the class described comprising a plate, and attaching members secured thereto and laterally off-standing therefrom, each of said attaching members having a longitudinal slot therein for receiving a respective guide member, said attaching members having the longitudinal axes of their respective slots disposed in parallel relation, the attaching members being curved upwardly at their free ends, the curvature of each respective attaching member extending from a point intermediate the ends of the slot to the free edge of said attaching member.

4. In combination, a mowing machine comprising a frame, guide members secured to the frame, a guard member comprising a plate, having a straight portion and a forward curved portion, an attaching member secured to the plate and laterally off-standing from the straight portion thereof, and an attaching member secured to the plate and laterally off-standing from the curved portion thereof, each of said attaching members having a longitudinal slot therein for receiving a respective one of said guide members, said attaching members having the longitudinal axes of their respective slots disposed in parallel relation.

5. In combination, a mowing machine comprising a frame, guide members secured to the frame, a guard member comprising a plate having a straight portion and a forward curved portion, an attaching member comprising a lug secured to the straight portion of said plate adjacent the upper edge thereof and laterally off-standing therefrom, an attaching member comprising a lug secured to the curved portion of said plate adjacent to the upper edge thereof and laterally off-standing therefrom, said attaching members having slots the longitudinal axes of which are disposed in parallel relation and normal to the plane of the adjacent portion of said plate, said slots receiving the guide members.

6. In a machine of the class described, comprising a frame, in combination, a pair of guide members secured to the frame and extending upwardly therefrom in spaced relation to one another, a guard member comprising a plate, attaching members secured to the plate and laterally off-standing therefrom, each of said attaching members having a longitudinal slot therein adapted to loosely receive a respective guide member, and a removable spacer member disposed on each of said guide members intermediately the frame and the respective attaching member.

7. In a machine of the class described, comprising a frame, in combination, a pair of guide pins secured to the frame and extending upwardly therefrom in spaced relation to one another, a guard member comprising a plate, attaching lugs secured to the plate and laterally off-standing therefrom, each of said attaching lugs having a longitudinal slot receiving a respective guide pin, said guide pins normally engaging the ends of the slots adjacent the free edges of the respective attaching lugs with the guard member extending downwardly from the frame and engaging the periphery thereof.

EDWARD H. ZIPF.

REFERENCES CITED

The following references are of record in the file of this patent:

UNITED STATES PATENTS

| Number | Name | Date |
| --- | --- | --- |
| 1,068,363 | Phillipson | July 22, 1913 |
| 1,326,094 | Puttergill | Dec. 23, 1919 |
| 1,347,937 | Clary | July 27, 1920 |
| 1,523,978 | Rougeot | Jan. 20, 1940 |
| 2,188,110 | Fahnestock | Jan. 23, 1940 |
| 2,208,972 | Goodall | July 23, 1940 |
| 2,278,922 | Goodall | Apr. 7, 1942 |